(12) United States Patent
Ohno et al.

(10) Patent No.: US 10,812,786 B2
(45) Date of Patent: Oct. 20, 2020

(54) OPTICAL TEST APPARATUS AND OPTICAL TEST METHOD

(71) Applicant: KABUSHIKI KAISHA TOSHIBA, Tokyo (JP)

(72) Inventors: Hiroshi Ohno, Tokyo (JP); Hiroya Kano, Kawasaki Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 16/288,754

(22) Filed: Feb. 28, 2019

(65) Prior Publication Data
US 2019/0364267 A1 Nov. 28, 2019

(30) Foreign Application Priority Data

May 23, 2018 (JP) ................................. 2018-099203

(51) Int. Cl.
G01J 3/46 (2006.01)
H04N 17/00 (2006.01)
H04N 5/225 (2006.01)
G02B 5/20 (2006.01)

(52) U.S. Cl.
CPC .......... H04N 17/002 (2013.01); G02B 5/201 (2013.01); H04N 5/2254 (2013.01)

(58) Field of Classification Search
CPC .... H04N 17/002; H04N 5/2254; G02B 5/201; G02B 27/00; G01B 9/00
See application file for complete search history.

(56) References Cited

U.S. PATENT DOCUMENTS

| 5,943,172 A * | 8/1999 | Sasaya ................. G02B 9/12 359/754 |
| 2008/0123079 A1 | 5/2008 | Numata et al. |
| 2011/0075151 A1 * | 3/2011 | Jeong ................. G01N 21/956 356/453 |
| 2017/0318207 A1 * | 11/2017 | Chanin ................. H04N 5/332 |
| 2019/0219501 A1 | 7/2019 | Ohno et al. |

FOREIGN PATENT DOCUMENTS

| JP | 2008-134186 A | 6/2008 |
| JP | 2019-124542 A | 7/2019 |

OTHER PUBLICATIONS

W. L. Howes, "Rainbow schlieren and its applications", Applied Optics, vol. 23, No. 14, pp. 2449-2460 (1984).
J. S. Kim, et al., "Multiaperture telecentric lens for 3D reconstruction", Optics Letters, vol. 36, No. 7, pp. 1050-1052 (2011).

* cited by examiner

Primary Examiner — Abdullahi Nur
(74) Attorney, Agent, or Firm — Finnegan, Henderson, Farabow, Garrett & Dunner, L.L.P.

(57) ABSTRACT

According to one embodiment, an optical test apparatus includes a first optical system, a second optical system, and an image sensor. The first optical system is configured to pass a light ray of a first wavelength and having telecentricity on an object side for the light ray of the first wavelength. The second optical system is configured to pass a light ray of a second wavelength different from the first wavelength. The image sensor is configured to image an object based on the light ray of the first wavelength having passed through the first optical system and the light ray of the second wavelength having passed through the second optical system.

17 Claims, 11 Drawing Sheets

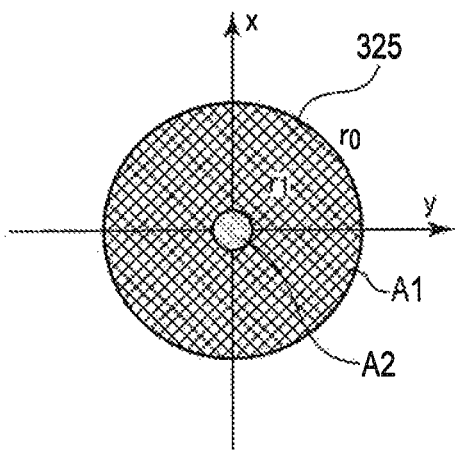
F I G. 9
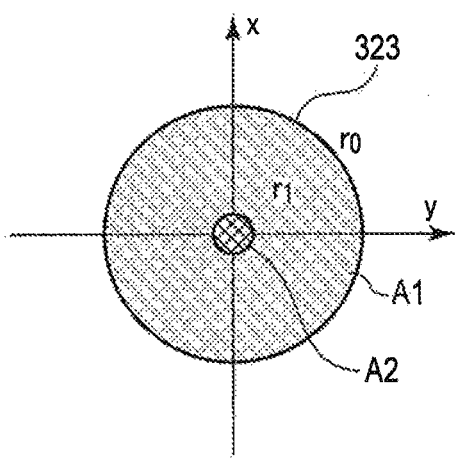
F I G. 10

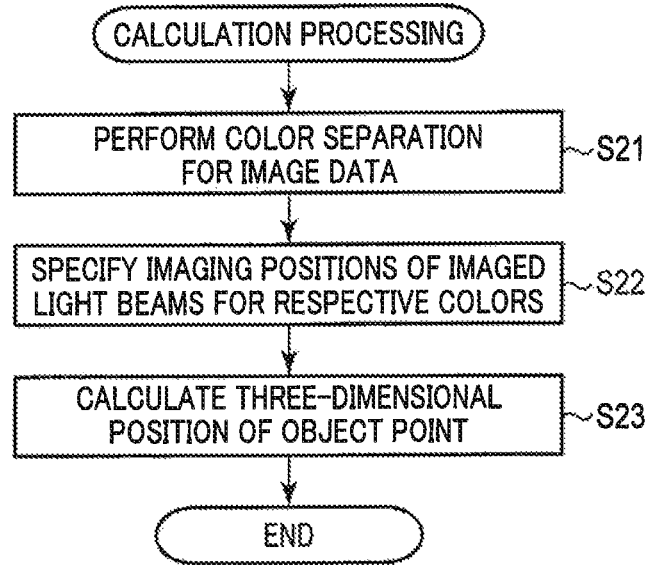
F I G. 11
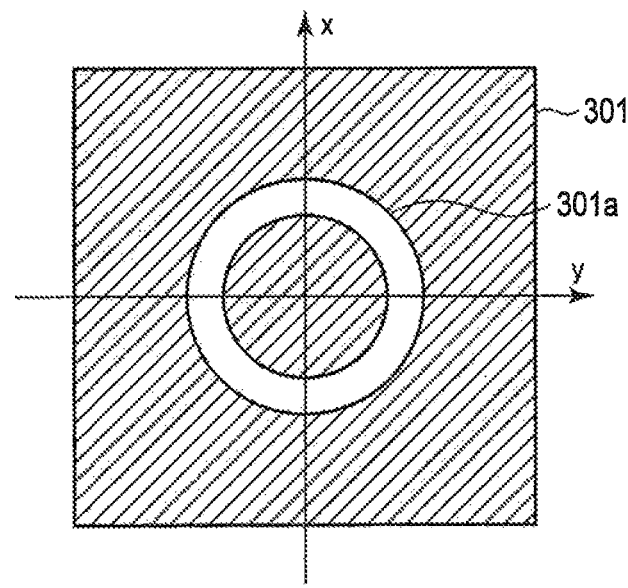
F I G. 12

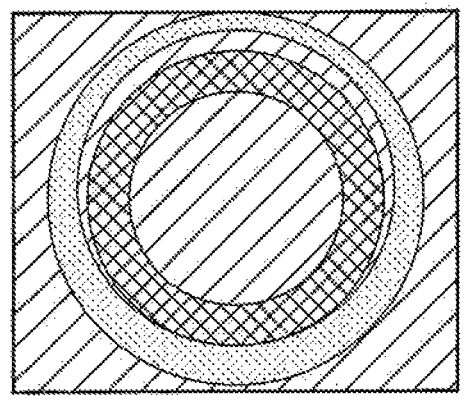
F I G. 13A
z=160mm
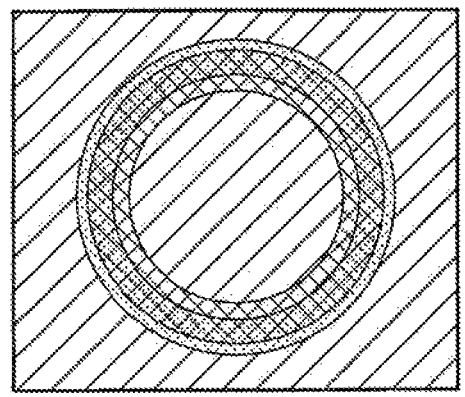
F I G. 13B
z=210mm
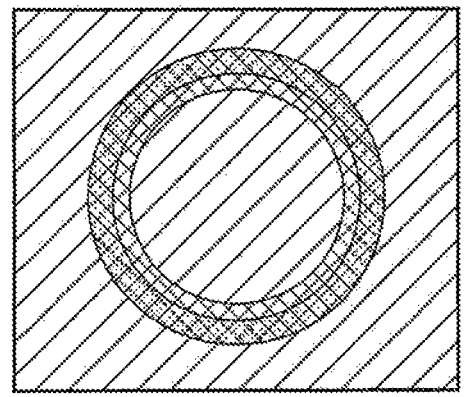
F I G. 13C
z=225mm

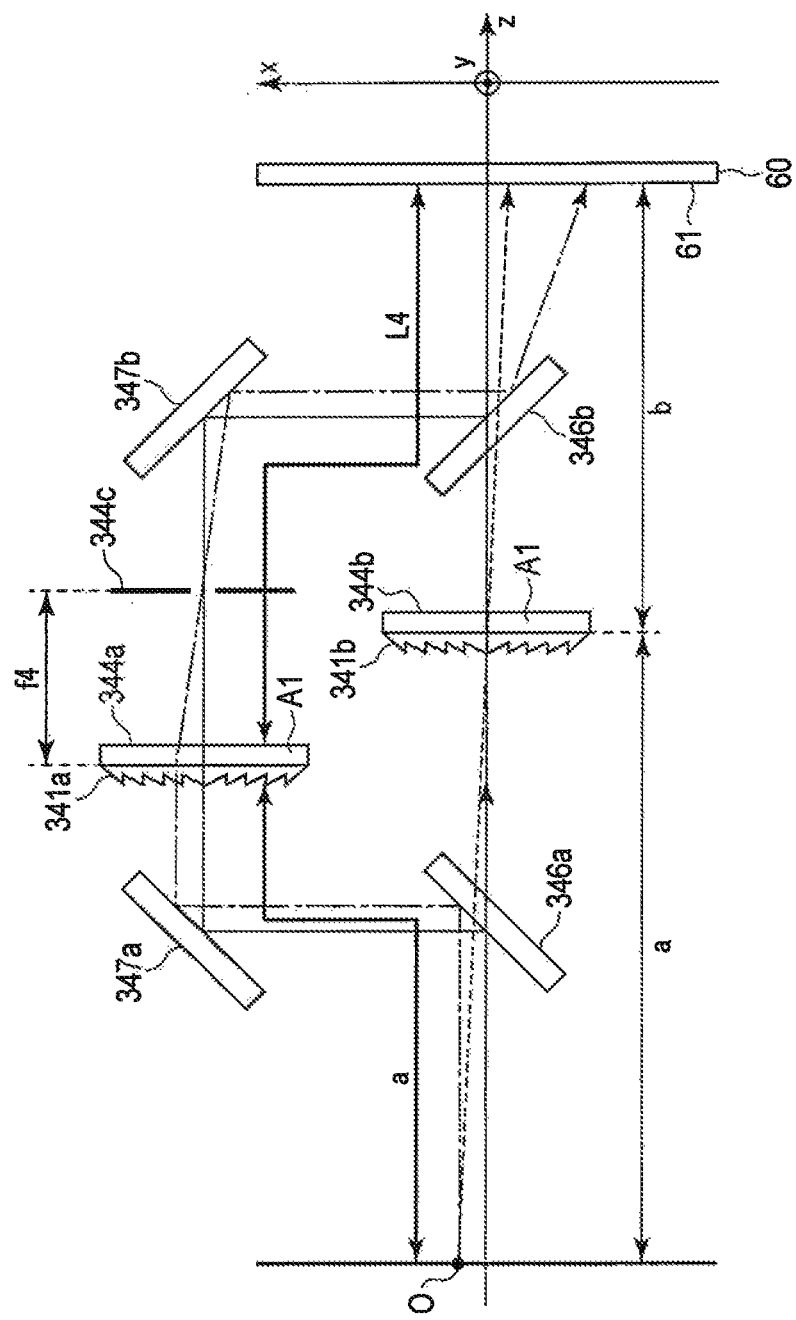
F I G. 16

OPTICAL TEST APPARATUS AND OPTICAL TEST METHOD

CROSS-REFERENCE TO RELATED APPLICATION

This application is based upon and claims the benefit of priority from Japanese Patent Application No. 2018-099203, filed May 23, 2018, the entire contents of which are incorporated herein by reference.

FIELD

Embodiments described herein relate generally to an optical test apparatus and an optical test method.

BACKGROUND

In various industries, contactless test techniques have become important.

BRIEF DESCRIPTION OF THE DRAWINGS

FIG. 9 is a schematic view showing an example of the x-y section of the opening of the second color filter according to the second embodiment;

FIG. 10 is a schematic view showing an example of the x-y section of the opening of the first color filter according to the second embodiment;

FIG. 11 is a flowchart illustrating an example of calculation processing according to the second embodiment;

FIG. 12 is a view for explaining an object point in actual measurement and evaluation according to the second embodiment;

FIG. 13A shows an image acquired in actual measurement and evaluation performed by arranging a field stop at a position 160 mm away from the first lens on the −z side;

FIG. 13B shows an image acquired in actual measurement and evaluation performed by arranging the field stop at a position 210 mm away from the first lens on the −z side;

FIG. 13C shows an image acquired in actual measurement and evaluation performed by arranging the field stop at a position 225 mm away from the first lens on the −z side;

FIG. 16 is an x-z sectional view showing an example of the arrangement of an optical device according to the fourth embodiment;

DETAILED DESCRIPTION

Figure 1:
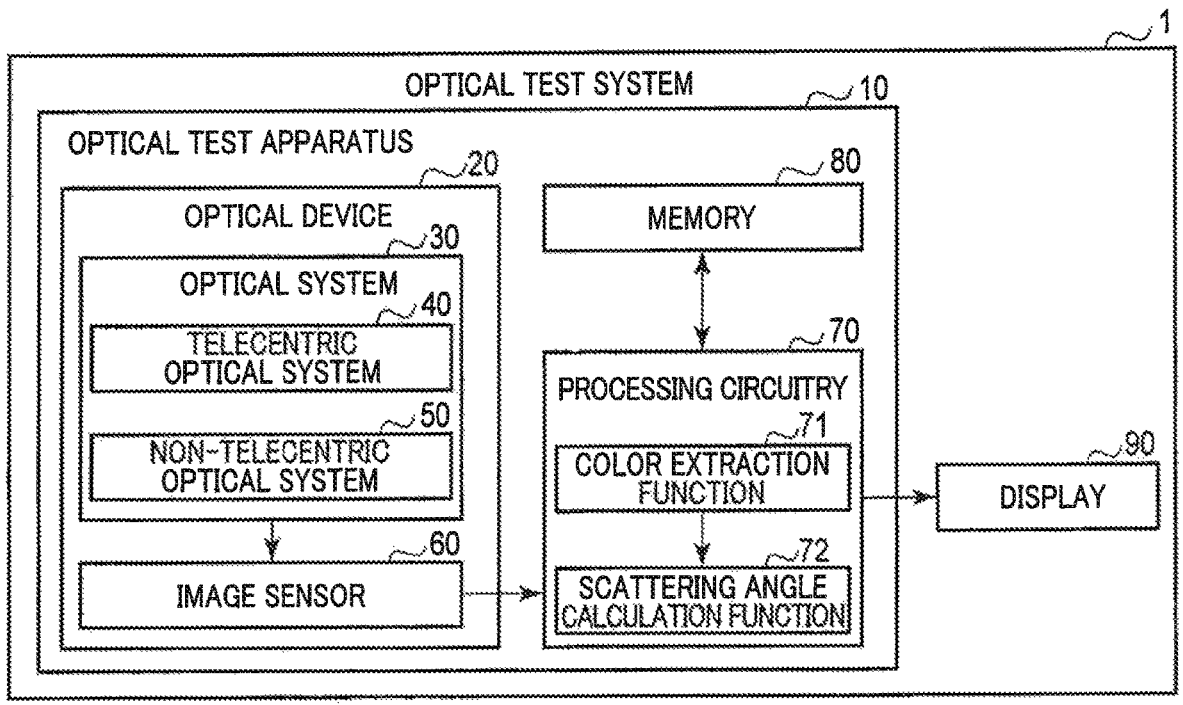
FIG. 1 is a block diagram showing an example of the arrangement of an optical test system according to the first embodiment.

According to one embodiment, an optical test apparatus includes a first optical system, a second optical system, and an image sensor. The first optical system is configured to pass a light ray of a first wavelength and having telecentricity on an object side for the light ray of the first wavelength. The second optical system is configured to pass a light ray of a second wavelength different from the first wavelength. The image sensor is configured to image an object based on the light ray of the first wavelength having passed through the first optical system and the light ray of the second wavelength having passed through the second optical system.

Various Embodiments will be described hereinafter with reference to the accompanying drawings. Each drawing is schematic or conceptual and the relationship between the thickness and the width of each part and the size ratio between the respective parts are not necessarily the same as actual ones. In addition, even when the same portions are shown, the portions are sometimes shown in different dimensions and ratios depending on the drawings. Note that in this specification and the respective drawings, the same reference numerals denote the same components described with reference to the drawings already referred to. A detailed description of such components will be omitted as appropriate.

Light or a light ray in a description of each embodiment is not limited to visible light or a visible light ray. However, the following description will exemplify a case in which white light is used as environment light. The light ray may also be a light beam.

First Embodiment

The arrangement of an optical test system 1 according to this embodiment will be described first in detail below with reference to the accompanying drawings.

FIG. 1 is a block diagram showing an example of the arrangement of an optical test system 1 according to this embodiment. As shown in FIG. 1, the optical test system 1 includes an optical test apparatus 10 and a display 90. The optical test apparatus 10 includes an optical device 20, processing circuitry 70, and a memory 80. The optical device 20 includes an optical system 30 and an image sensor 60.

Figure 2:
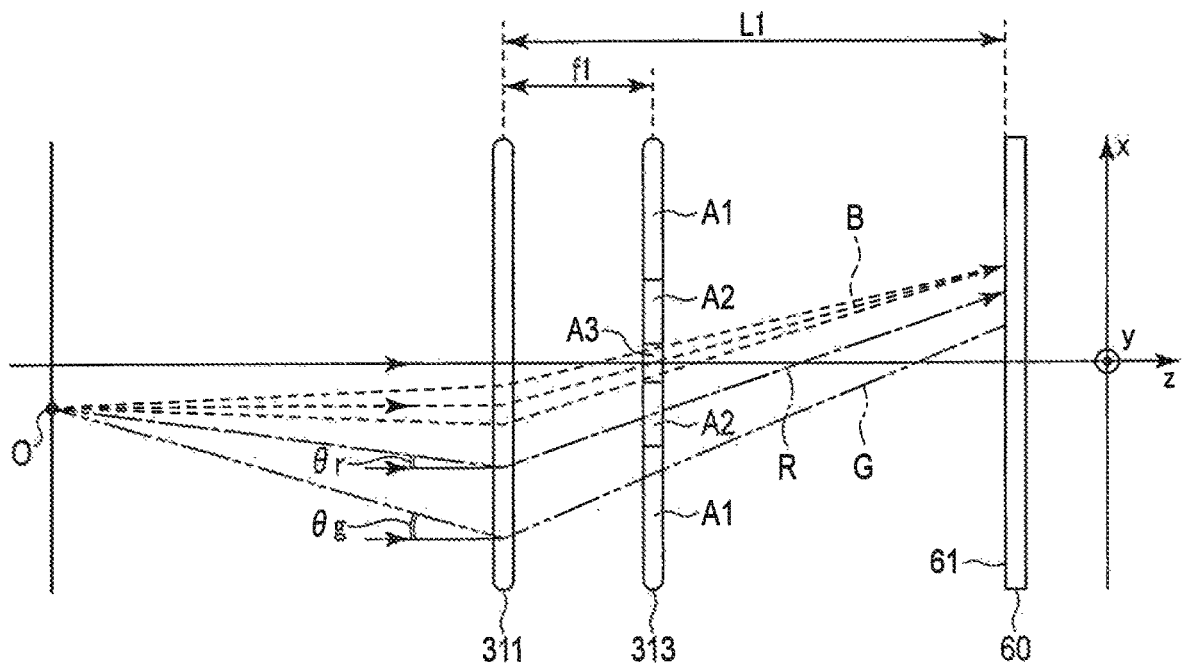
FIG. 2 is an x-z sectional view showing an example of the arrangement of an optical device according to the first embodiment.
Figure 3:
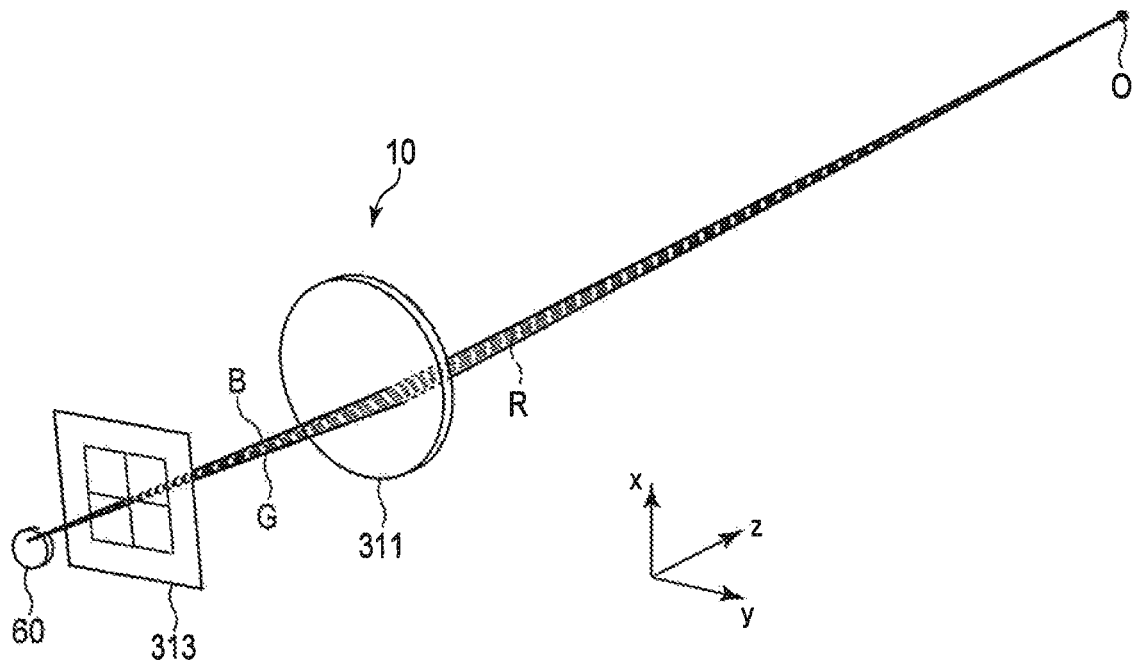
FIG. 3 is a bird's eye view schematically showing the example of the arrangement of the optical device according to the first embodiment.
Figure 4:
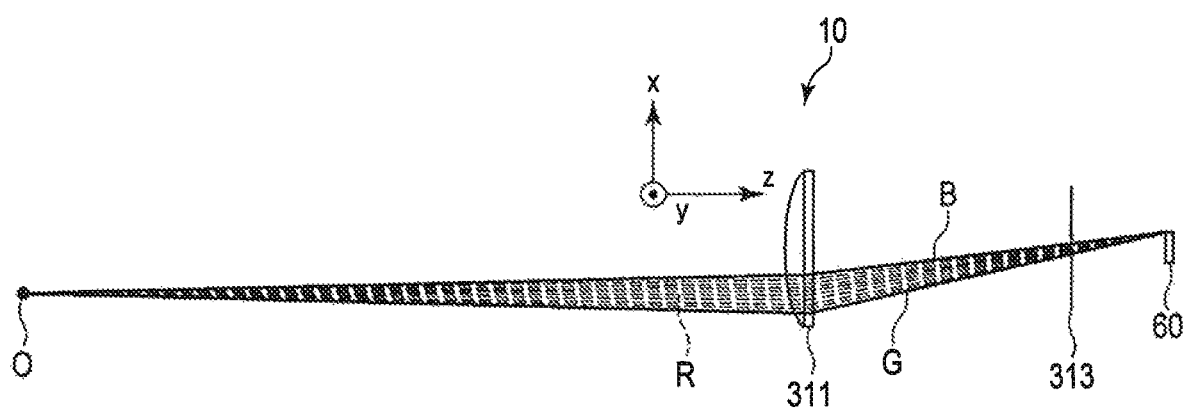
FIG. 4 is a side view schematically showing the example of the arrangement of the optical device according to the first embodiment.

FIG. 2 is an x-z sectional view showing an example of the arrangement of an optical device 20 according to this embodiment. FIG. 3 is a bird's eye view schematically showing the example of the arrangement of the optical device 20 according to this embodiment. FIG. 4 is a side view schematically showing the example of the arrangement of the optical device 20 according to this embodiment. Note that FIGS. 2, 3, and 4 each schematically show examples of the light ray paths of light rays emitted from an object point O. As shown in FIGS. 2, 3, and 4, the optical system 30 includes a first lens 311 and a first color filter 313.

Note that in this embodiment, each of x-, y-, and z-axes is defined as follows; The z-axis serves as the optical axis of the first lens 311. The +z direction is a direction from the first lens 311 to an imaging plane 61 of the image sensor 60. The x- and y-axes are orthogonal to each other, and also orthogonal to the z-axis. The −x direction is, for example, the gravity direction. For example, in the x-z sectional view of the optical device 20 shown in FIG. 2, the +z direction is a direction from left to right, the −x direction is a direction from above to below, and the +y direction is a direction from back to front perpendicularly with respect to a paper surface.

The first lens 311 forms an image of the light ray emitted from the object point O on a subject at an image point on the imaging plane 61 of the image sensor 60. The subject is an example of an object. The first lens 311 is an example of a shared lens. The image-side focal length f of the first lens 311 is a focal length f1. The first lens 311 is made of, for example, optical glass. The present invention, however, is not limited to this. The first lens 311 may be made of, for example, optical plastic such as an acrylic resin (polymethyl methacrylate: PMM) or polycarbonate (PC). Note that the first lens 311 may be one lens or an optical system formed by a combination of a plurality of lenses.

The first color filter 313 is arranged at the image-side focal point (image-side focus) of the first lens 311. That is, the first color filter 313 is arranged at a position away from the first lens 311 on the +z side by the focal length f1. The first color filter 313 restricts a solid angle obtained by setting, as a zenith direction, the +z-axis direction of light rays having passed through the first lens 311. The opening of the first color filter 313 can be expressed as being located on the image-side focal plane of the first lens 311. The first color filter 313 includes a support member and a wavelength selecting member (neither of which is shown). The opening is provided on the support member. The wavelength selecting member is provided in the opening of the support member. The center of the wavelength selecting member is located on the z-axis. The wavelength selecting member has a property of transmitting a spectral ray of a specific wavelength. Note that transmission may be expressed by passing. The wavelength selecting member is, for example, a color filter.

Note that the wavelength selecting member can include a transparent member that transmits a light ray of any wavelength in the visible light range and a black member that does not transmit a light ray of any wavelength in the visible light range. The transparent member can be expressed as a transparent member that transmits white light (visible light). Note that the transparent member need not be provided.

Figure 5:
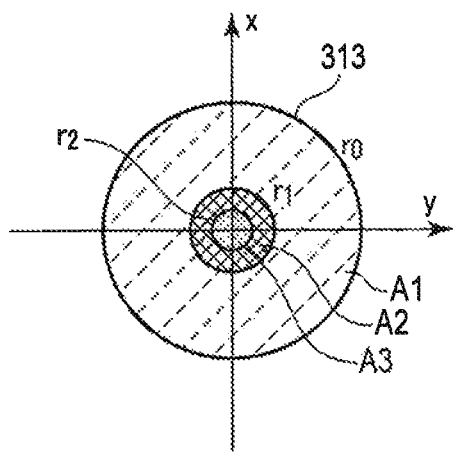
FIG. 5 is a schematic view showing an example of the x-y section of the opening of the first color filter according to the first embodiment.

The arrangement of the first color filter 313 will be described in more detail. FIG. 5 is a schematic view showing an example of the x-y section of the opening of the first color filter 313 according to this embodiment. As shown in FIG. 5, the outer shapes of the opening of the first color filter 313 and the wavelength selecting member are, for example, circular, but may be polygonal. The wavelength selecting member of the first color filter 313 includes a plurality of wavelength selecting regions. In this embodiment, a case in which a plurality of wavelength selecting regions are, for example, coaxially concentrically provided will be exemplified. The radii of concentric circles respectively defining the wavelength selecting regions are sequentially described by r0, r1, and r2 from the outside. As shown in FIG. 5, the wavelength selecting region of the first color filter 313 is concentrically divided into three regions of a first region A1, a second region A2, and a third region A3 from the outside.

The first region A1 is a region ranging from the radius r1 to the radius r0. In the first region A1, a green transmission filter that transmits a green light ray is provided. The green transmission filter is an example of the third wavelength selecting filter. That is, the first region A1 of the first color filter 313 is a region that transmits a green light ray. In FIG. 5, a region hatched by diagonal broken lines is a region that transmits a green light ray.

The second region A2 is a region ranging from the radius r2 to the radius r1. In the second region A2, a red transmission filter that transmits a red light ray is provided. The red transmission filter is an example of the second wavelength selecting filter. That is, the second region A2 of the first color filter 313 is a region that transmits a red light ray. In FIG. 5, a crosshatched region is a region that transmits a red light ray.

The third region A3 is a region ranging over the radius r2 or less. In the third region A3, a blue transmission filter that transmits a blue light ray is provided. The blue transmission filter is an example of the first wavelength selecting filter. That is, the third region A3 of the first color filter 313 is a region that transmits a blue light ray. In FIG. 5, a dot-hatched region is a region that transmits a blue light ray.

As described above, the first, second, and third wavelength selecting filters are formed integrally as the first color filter 313. At this time, the respective wavelength selecting filters are arranged to be rotationally symmetrical with respect to the optical axis of the first lens 311. The first wavelength selecting filter is arranged on the light ray paths of light rays among which the principal ray passes through the image-side focal point of the first lens 311. Assume that in this case, the peak wavelength of a wavelength spectrum of, for example, a blue light ray is 450 nm. The wavelength of the light ray indicating blue is an example of the first wavelength. Assume that the peak wavelength of a wavelength spectrum of, for example, a red light ray is 650 nm. The wavelength of the light ray indicating red is an example of the second wavelength. Furthermore, assume that the peak wavelength of a wavelength spectrum of, for example, a green light ray is 530 nm. The wavelength of the light ray indicating green is an example of the third wavelength.

Note that the optical system 30 according to this embodiment can be expressed as including a telecentric optical system 40 and a non-telecentric optical system 50. The telecentric optical system 40 is an example of the first optical system. The non-telecentric optical system 50 is an example of the second optical system. The telecentric optical system 40 includes the first lens 311 and the first color filter 313. The telecentric optical system 40 is an optical system having telecentricity for the blue light ray. The telecentric optical system 40 is an object-side telecentric optical system. In the object-side telecentric optical system, an entrance pupil is located at an infinite position, and an optical axis and a principal ray are parallel to each other in an object space. The object-side telecentric optical system may be expressed as a subject-space telecentric optical system. The non-telecentric optical system 50 includes the first lens 311 and the first color filter 313. The non-telecentric optical system 50 is an optical system that transmits the red and green light rays. The non-telecentric optical system 50 is an optical system that does not transmit the blue light ray. The correspondences of the wavelengths (e.g., red, green, and blue) with the non-telecentric optical system or the telecentric optical system are not limited to the above-mentioned case, but are replaceable. The non-telecentric optical system 50 is an optical system having no telecentricity for the blue light ray. That is, the telecentric optical system 40 and the non-telecentric optical system 50 can be expressed as sharing at least one lens. The shared lens is, for example, the first lens 311, and is arranged on the optical axis of the telecentric optical system 40. As shown in FIG. 2, the optical axis of the telecentric optical system 40 and that of the non-telecentric optical system 50 are coaxial with each other.

Note that the non-telecentric optical system is an optical system having no telecentricity such as an entocentric optical system, magnification optical system, or reduction optical system.

The image sensor 60 is arranged on the +z side with respect to the image-side focal point of the first lens 311. An optical path length L between the imaging plane 61 of the image sensor 60 and the image-side principal point of the first lens 311 is an optical path length L1. The imaging plane 61 of the image sensor 60 is located on the image formation plane of the first lens 311. That is, the imaging plane 61 of the image sensor 60 is arranged on the −z side with respect to the first color filter 313. The image sensor 60 is, for example, a CCD (Charge-Coupled Device). The image sensor 60 is, for example, a single-CCD type color CCD but may be a 3CCD type color CCD. The image sensor 60 outputs a light reception intensity for each pixel with respect to a light ray entering the imaging plane 61. That is, the image sensor 60 outputs the light reception position and light reception intensities of the light ray entering the imaging plane 61. The image sensor 60 is not limited to the CCD, and may be an image sensor such as a CMOS (Complementary Metal-Oxide Semiconductor) or a light receiving element. The image sensor 60 can be expressed as being capable of imaging an object based on a light ray having passed through the telecentric optical system 40 and a light ray having passed through the non-telecentric optical system 50. Note that the image sensor 60 can also be expressed as being capable of imaging, among light rays emitted from the object point O, a light ray having passed through the telecentric optical system 40 and a light ray having passed through the non-telecentric optical system 50. Furthermore, the image sensor 60 can be expressed as being configured to coaxially image, among the light rays emitted from the object point O, the light ray having passed through the telecentric optical system 40 and the light ray having passed through the non-telecentric optical system 50.

The processing circuitry 70 is, for example, an integrated circuit such as a CPU (Central Processing Unit) or ASIC (Application Specific Integrated Circuit). A general-purpose computer may be used as the processing circuitry 70. The processing circuitry 70 is not limited to a case in which the processing circuitry 70 is provided as a dedicated circuit, and may be provided as a program to be executed in a computer. In this case, the program is recorded in a memory area in the integrated circuit, the memory 80, or the like. The processing circuitry 70 is connected to the image sensor 60 and the memory 80. The processing circuitry 70 calculates information pertaining to the subject based on the output from the image sensor 60. The information pertaining to the subject is an example of information pertaining to the object. The processing circuitry 70 functions as a color extraction function 71 and a scattering angle calculation function 72. The color extraction function 71 acquires intensities for R, G, and B of the light ray having reached the imaging plane based on the output from the image sensor 60. The color extraction function 71 generates image data for respective colors by performing color separation for image data output from the image sensor 60. The color extraction function 71 is an example of a generation function. The scattering angle calculation function 72 calculates information pertaining to the subject including the object point O based on the image data for respective colors. More specifically, the scattering angle calculation function 72 specifies the color of the light ray imaged based on the image data for respective colors. The scattering angle calculation function 72 calculates the scattering angle of environment light at the object point O of the subject based on the color of the imaged light ray, that is, the intensities for R, G, and B of the light ray having reached the imaging plane 61. The scattering angle calculation function 72 is an example of a calculation function. The scattering angle at the object point O of the subject is an example of the information pertaining to the subject.

Note that the processing circuitry 70 may exist outside the optical test apparatus 10. In this case, the output from the image sensor 60 is output outside the optical test apparatus 10 or recorded in the memory 80. That is, the information pertaining to the subject may be calculated inside or outside the optical test apparatus 10.

The memory 80 stores the output from the image sensor 60 or the processing circuitry 70. The memory 80 records the focal length f1 of the first lens 311, the distance between the first lens 311 and the imaging plane 61, the arrangement of the plurality of wavelength selecting regions of the first color filter. 313, and the like. Note that the memory 80 may record in advance the relationship between the scattering angle and the intensities of R, G, and B of the light ray. The memory 80 is, for example, a nonvolatile memory like a flash memory, but a volatile memory may also be provided.

The display 90 displays the output from the processing circuitry 70. The output from the processing circuitry 70 includes, for example, an operation screen, and an image based on the image data output from the image sensor 60, The display 90 is, for example, a liquid crystal display or an organic EL display. Note that the display 90 need not be provided. In this case, the output from the processing circuitry 70 may be recorded in the memory 80, displayed on a display provided outside the optical test system 1, or recorded in a memory provided outside the optical test system 1.

Next, the operation of the optical test system 1 according to this embodiment will be described in detail with reference to the accompanying drawings. In the following description, light rays emitted from the arbitrary object point O on the subject are obtained when environment light is scattered at the arbitrary object point O on the subject. Note that environment light is white light.

Light rays emitted from the arbitrary object point O and entering the first lens 311 will be described first. FIG. 2 shows, as examples of the light rays, light rays B among which the principal ray is parallel to the optical axis when entering the first lens 311, light rays R among which the principal ray has an inclination of θr with respect to the optical axis when entering the first lens 311, and light rays G among which the principal ray has an inclination of θg with respect to the optical axis when entering the first lens 311. Note that FIG. 2 shows only the principal rays for the light rays R and G. In FIG. 2, the light rays B imaged as blue light rays are represented by broken lines, the light ray R imaged as a red light ray is represented by a one-dot dashed line, and the light ray G imaged as a green light ray is represented by a two-dot dashed line.

The light rays B are light rays that pass through the first lens 311, and then enter the third region A3 of the first color filter 313. The opening plane of the first color filter 313 is arranged on the image-side focal plane of the first lens 311. The third region A3 is provided at the center of the opening plane of the first color filter 313. Among the light rays B having entered the third region A3 of the first color filter 313, the blue light rays B can pass through the first color filter 313. The blue light rays B emitted from the first color filter 313 enter the imaging plane 61. In this way, among the light rays that have been emitted from the arbitrary object point O and entered the first lens 311, the light rays B parallel to the optical axis of the first lens 311 reach the imaging plane 61 as the blue light rays B.

The light rays R are light rays that pass through the first lens 11, and then enter the second region A2 of the first color filter 313. The second region A2 is a concentric region coaxial with the third region A3, which is outside the third region A3 of the first color filter 313. Among the light rays R having entered the second region A2 of the first color filter 313, the red light ray R can pass through the first color filter 313. The red light ray R emitted from the first color filter 313 enters the imaging plane 61. In this way, among the light rays that have been emitted from the arbitrary object point O and entered the first lens 311, the light ray R having an inclination of with respect to the optical axis of the first lens 311 reaches the imaging plane 61 as the red light ray R.

The light rays G are light rays that pass through the first lens 311, and then enter the first region A1 of the first color filter 313. The first region A1 is a concentric region coaxial with the third region A3 and the second region A2, which is outside the second region A2 of the first color filter 313. Among the light rays G having entered the first region A1 of the first color filter 313, the green light ray G can pass through the first color filter 313. The green light ray G emitted from the first color filter 313 enters the imaging plane 61. In this way, among the light rays that have been emitted from the arbitrary object point O and entered the first lens 311, the light ray G having an inclination of θg with respect to the optical axis of the first lens 311 reaches the imaging plane 61 as the green light ray G. Note that θg is larger than θr.

As described above, in the optical device 20 according to this embodiment, the light rays emitted from the arbitrary object point O are imaged as light rays of colors corresponding to angles formed with the optical axis when entering the first lens 311. That is, in the optical device 20 according to this embodiment, the light rays emitted from the arbitrary object point O undergo color separation as blue, red, and green light rays in ascending order of the angles formed by the light rays and the optical axis. Assume that θ represents the angle formed by the light ray and the optical axis. In this case, when $0 \leq \theta < \theta r$, the light ray emitted from the arbitrary object point O undergoes color separation as a blue light ray. When $\theta r \leq \theta < \theta g$, the light ray emitted from the arbitrary object point O undergoes color separation as a red light ray. When $\theta g \leq \theta$, the light ray emitted from the arbitrary object point O undergoes color separation as a green light ray.

In addition, in the optical device 20 according to this embodiment, among the light rays emitted from the Arbitrary object point O, the light rays B among which the principal ray is parallel to the optical axis when entering the first lens 311 are separated as blue light rays. That is, the optical device 20 according to this embodiment can be expressed as a telecentric optical system having telecentricity for the blue light rays. On the other hand, the optical device 20 according to this embodiment can be expressed as a non-telecentric optical system having no telecentricity for the red light rays R and the green light rays G.

Figure 6:
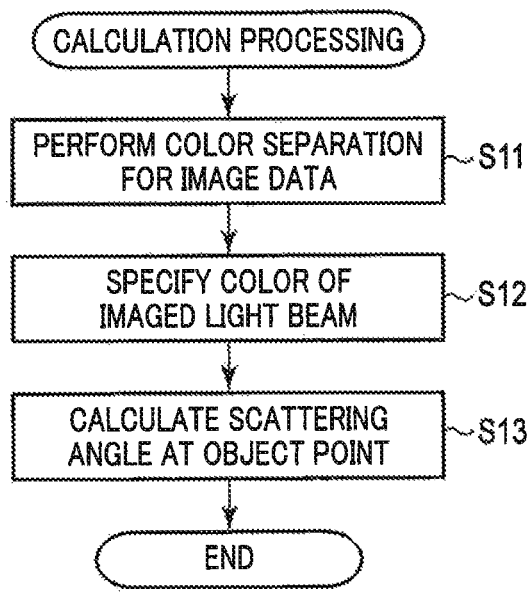
FIG. 6 is a flowchart illustrating an example of calculation processing according to the first embodiment.

The operation of the processing circuitry 70 will be described with reference to the accompanying drawings. FIG. 6 is a flowchart illustrating an example of calculation processing according to this embodiment. The processing circuitry 70 according to this embodiment calculates information pertaining to the subject based on the output from the image sensor 60 in the calculation processing.

In step S11, the processing circuitry 70 serving as the color extraction function 71 acquires, based on the output from the image sensor 60, intensities for R, G, and B of the light ray that has been emitted from the arbitrary object point O and entered the imaging plane 61. This performs color separation for the image data.

In step S12, the processing circuitry 70 serving as the color extraction function 71 specifies the color of the light ray that has been emitted from the arbitrary object point O and entered the imaging plane 61.

In step S13, the processing circuitry 70 serving as the scattering angle calculation function 72 calculates the scattering angle of environment light at the object point O based on the specified color of the light ray. In the optical device 20 according to this embodiment, the plurality of wavelength selecting regions of the first color filter 313 are arranged concentrically. That is, in the optical device 20 according to this embodiment, the wavelength selecting regions of the first color filter 313 are rotationally symmetrical with respect to the optical axis of the first lens 311. Therefore, the color rays undergo color separation in accordance with the scattering angle at the arbitrary object point O. If the specified color of the light ray is blue, the processing circuitry 70 serving as the scattering angle calculation function 72 calculates the scattering angle at the object point O to satisfy $0 \leq \theta < \theta r$. If the specified color of the light ray is red, the processing circuitry 70 serving as the scattering angle calculation function 72 calculates the scattering angle at the object point O to satisfy $\theta r \leq \theta < \theta g$. If the specified color of the light rays is green, the processing circuitry 70 serving as the scattering angle calculation function 72 calculates the scattering angle at the object point O to satisfy $\theta g \leq \theta$.

As described above, the optical test apparatus 10 according to this embodiment can determine the scattering angle at the object point O based on the color of the imaged light ray. That is, the optical test apparatus 10 has the effect capable of determining the scattering angle at the object point O in accordance with color.

Note that this embodiment has exemplified a case in which information pertaining to the subject including the object point O is calculated based on environment light scattered at the object point O. The present invention, however, is not limited to this. For example, the optical test apparatus 10 may further include a light source. In this case, it is possible to acquire information pertaining to whether a medium that can refract or scatter a light ray emitted from the light source exists between the light source and the first lens 311, and information pertaining to the degree of refraction or scattering by the medium. For example, the optical test apparatus 10 may include a transmissive dot pattern or the like instead of the light source, and may be configured to specify a position on the subject surface as the object point O. This specification can be implemented by image processing such as pixel matching or edge detection.

As described above, the technique according to this embodiment can accurately measure the scattering characteristic of the surface of the subject or a refractive index distribution in the three-dimensional space.

Second Embodiment

An optical test system 1 according to this embodiment will be described in detail below with reference to the accompanying drawings. The difference from the first embodiment will mainly be described. The same reference numerals denote the same parts and a description thereof will be omitted.

In this embodiment, the wavelength of a red light ray is an example of the first wavelength. The wavelength of a blue light ray is an example of the second wavelength.

The arrangement of the optical test system 1 according to this embodiment will be described first.

Figure 7:
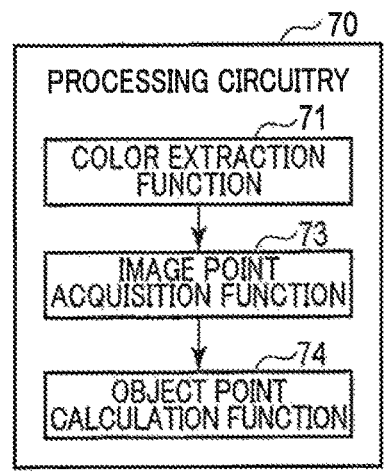
FIG. 7 is a block diagram showing an example of the arrangement of processing circuitry according to the second embodiment.

FIG. 7 is a block diagram showing an example of the arrangement of processing circuitry 70 according to this embodiment. The processing circuitry 70 functions as a color extraction function 71, an image point acquisition function 73, and an object point calculation function 74. The color extraction function 71 acquires, based on an output from an image sensor 60, intensities for R, G, and B of light rays having reached an imaging plane. The color extraction function 71 is an example of a generation function. The color extraction function 71 performs color separation for image data output from the image sensor 60, thereby generating image data for respective colors. The image point acquisition function 73 and the object point calculation function 74 are Provided as an example of a calculation function. The calculation function calculates information pertaining to a subject including an object point O based on the image data for respective colors. More specifically, the image point acquisition function 73 acquires, based on the output from the color extraction function 71, the incident positions of the light rays for R, G, and B on an imaging plane 61. The image point acquisition function 73 specifies the imaging position of the light ray emitted from the object point O in each of the image data for respective colors. The object point calculation function 74 calculates the three-dimensional position of the object point O of the subject based on the imaging positions of the light rays on the imaging plane 61. That is, the object point calculation function 74 calculates the three-dimensional position of the object point O as information pertaining to the subject based on the plurality of imaging positions. The three-dimensional position of the object point O of the subject is an example of the information pertaining to the subject. The three-dimensional position of the object point O may be expressed as the three-dimensional position of a point on an object as the subject.

Figure 8:
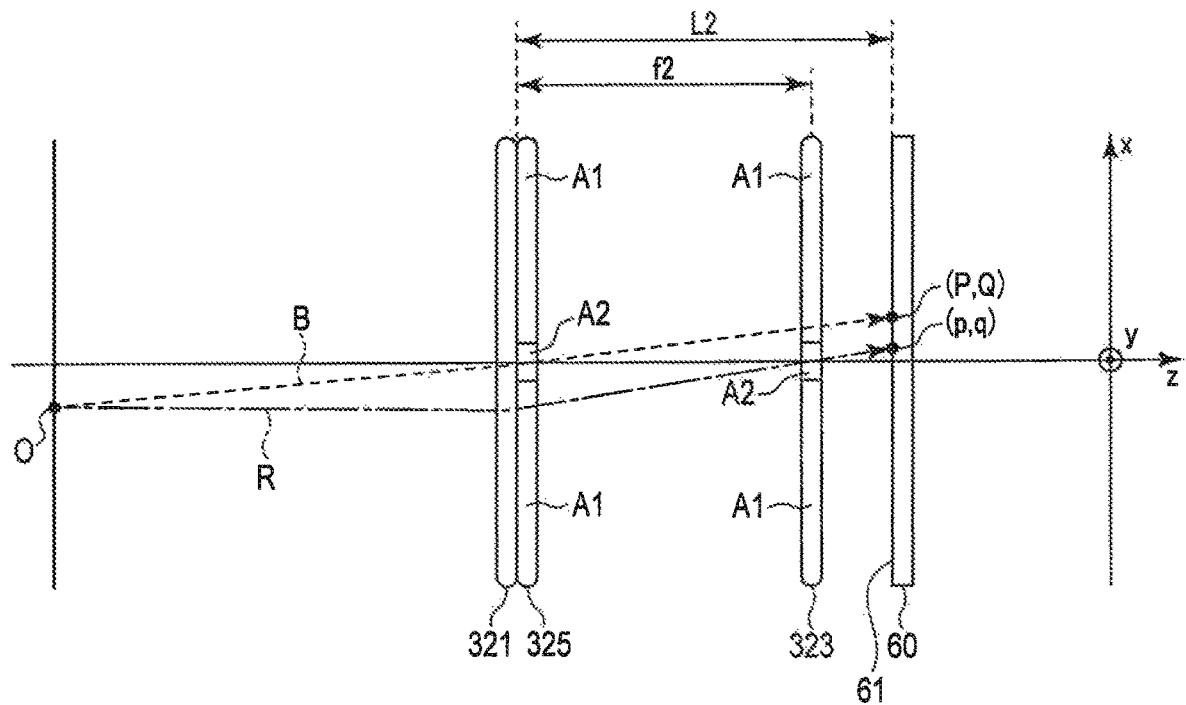
FIG. 8 is an x-z sectional view showing an example of the arrangement of an optical device according to the second embodiment.

FIG. 8 is an x-z sectional view showing an example of the arrangement of an optical device 20 according to this embodiment. Note that FIG. 8 schematically shows an example of the light ray path of the principal ray of light rays emitted from the object point O. As shown in FIG. 8, an optical system 30 according to this embodiment includes a first lens 321, a second color filter 325, and a first color filter 323.

Note that in this embodiment, the z-axis serves as the optical axis of the first lens 321. The +z direction is a direction from the first lens 321 to the imaging plane 61 of the image sensor 60. The x- and y-axes are orthogonal to each other, and also orthogonal to the z-axis. The −x direction is, for example, the gravity direction. For example, in the x-z sectional view of the optical device 20 shown in FIG. 8, the +z direction is a direction from left to right, the −x direction is a direction from above to below, and the +y direction is a direction from back to front perpendicularly with respect to a paper surface.

The first lens 321 forms an image of the light ray emitted from the object point O on the subject at an image point on the imaging plane 61 of the image sensor 60. The first lens 321 is an example of a shared lens. The image-side focal length f of the first lens 321 is a focal length f2. The first lens 321 corresponds to the first lens 311 according to the first embodiment. An optical path length L between the imaging plane 61 and the image-side principal point of the first lens 321 is an optical path length L2. The first lens 321 may be the same as or different from the first lens 311.

As shown in FIG. 8, the second color filter 325 is arranged adjacent to the first lens 321. The second color filter 325 is arranged on the +z side of the first lens 321. FIG. 9 is a schematic view showing an example of the x-y section of the opening of the second color filter 325 according to this embodiment. As shown in FIG. 9, a wavelength selecting member provided in the opening of the second color filter 325 includes two concentric wavelength selecting regions of a first region A1 and a second region A2.

The first region A1 is a region ranging from a radius r1 to a radius r0. In the first region A1, a red transmission filter that transmits a red light ray is provided. The red transmission filter of the second color filter 325 is an example of the fourth wavelength selecting filter. That is, the first region A1 of the second color filter 325 is a region that transmits a red light ray.

The second region A2 is a region ranging over the radius r1 or less. In the second region A2, a blue transmission filter that transmits a blue light ray is provided. The blue transmission filter of the second color filter 325 is an example of the fifth wavelength selecting filter. That is, the second region A2 of the second color filter 325 is a region that transmits a blue light ray. The second region A2 is arranged on the optical axis of the first lens 321.

Note that the second color filter 325 may be arranged on the −z side of the first lens 321.

As shown in FIG. 8, the first color filter 323 is arranged at the image-side focal point of the first lens 321. That is, the first color filter 323 is arranged at a position away from the first lens 321 on the +z side by the focal length f2. The first color filter 323 may be expressed as being arranged at a position away from the second color filter 325 on the +z side by the focal length f2. The opening of the first color filter 323 can be expressed as being located on the image-side focal plane of the first lens 321. The first color filter 323 is arranged at a position corresponding to the first color filter 313 according to the first embodiment.

FIG. 10 is a schematic view showing an example of the x-y section of the opening of the first color filter 323 according to this embodiment. As shown in FIG. 10, a wavelength selecting member provided in the opening of the first color filter 323 includes two concentric wavelength selecting regions of a first region A1 and a second region A2.

The first region A1 is a region ranging from a radius r1 to a radius r0. In the first region A1, a blue transmission filter that transmits a blue light ray is provided. The blue transmission filter of the first color filter 323 is an example of the second wavelength selecting filter. That is, the first region A1 of the first color filter 323 is a region that transmits a blue light ray.

The second region A2 is a region ranging over the radius r1 or less. In the second region A2, a red transmission filter that transmits a red light ray is provided. The red transmission filter of the first color filter 323 is an example of the first wavelength selecting filter. That is, the second region A2 of the first color filter 323 is a region that transmits a red light ray. The second region A2 is arranged on the optical axis of the first lens 321.

As described above, the first and second wavelength selecting filters are formed integrally as the first color filter 323. At this time, the respective wavelength selecting filters are arranged to be rotationally symmetrical with respect to the optical axis of the first lens 321. The first wavelength selecting filter is arranged on the light ray paths of light rays among which the principal ray passes through the image-side focal point of the first lens 321.

The operation of the optical test system 1 according to this embodiment will be described next.

Light rays including the light rays B and R are emitted from the arbitrary object point O on the subject surface. These light rays are light rays of environment light or the like reflected or scattered at the object point O. Among the light rays emitted from the arbitrary object point O, light rays having passed through the second color filter 325 and the first color filter 323 via the first lens 321 enter the imaging plane 61 of the image sensor 60.

Consider light rays that are parallel to the optical axis of the first lens 321 when entering the first lens 321. These light rays enter the second region A2 of the first color filter 323 arranged at the image-side focal point of the first lens 321. As shown in FIG. 8, among these light rays, the red light rays R transmitted through the first region A1 of the second color filter 325 via the first lens 321 can be transmitted through the second region A2 of the first color filter 323. On the other hand, the blue light rays transmitted through the second region A2 of the second color filter 325 via the first lens 321 include no red components, and thus cannot be transmitted through the second region A2 of the first color filter 323.

Next, consider light rays that are not parallel to the optical axis of the first lens 321 when entering the first lens 321. These light rays enter the first region A1 or a region outside the first region A1 of the first color filter 323 arranged at the image-side focal point of the first lens 321. That is, these light rays do not enter the second region A2 of the first color filter 323. Among these light rays, the red light rays transmitted through the first region A1 of the second color filter 325 via the first lens 321 include no blue components, and thus cannot be transmitted through the first region A1 of the first color filter 323. On the other hand, as shown in FIG. 8, the blue light rays B transmitted through the second region A2 of the second color filter 325 via the first lens 321 can be transmitted through the first region A1 of the first color filter 323.

As described above, the optical system 30 according to this embodiment is a telecentric optical system having telecentricity on the object side for the red light ray. On the other hand, the optical system 30 according to this embodiment is a non-telecentric optical system having no telecentricity on the object side for the blue light ray. In the optical system 30 according to this embodiment, the optical axis of the telecentric optical system and that of the non-telecentric optical system coincide with each other.

The image sensor 60 simultaneously images, among the light rays emitted from the arbitrary object point O, the red light ray R having passed through the optical system 30 as the telecentric optical system and the blue light ray B having passed through the optical system 30 as the non-telecentric optical system. The image sensor 60 outputs, to the processing circuitry 70, the imaging data obtained by performing imaging. The non-telecentric optical system may be expressed as a normal lens optical system.

The operation of the processing circuitry 70 will now be described. The processing circuitry 70 according to this embodiment calculates the three-dimensional shape of the subject based on the output from the image sensor 60. In measurement processing, calculation processing of calculating the three-dimensional position of the object point O is executed. The calculation processing includes following color extraction processing, image point acquisition processing, and object point calculation processing. FIG. 11 is a flowchart illustrating an example of the calculation processing according to this embodiment.

In step S21, the processing circuitry 70 executes color extraction processing. The processing circuitry 70 serving as the color extraction function 71 performs color separation for the imaging data, thereby extracting image data for respective colors. Note that the image data is described. However, the present invention is not limited to data that can be displayed as an image, and light ray intensity for each pixel of each color of the image sensor 60 need only be extracted.

In step S22, the processing circuitry 70 executes the image point acquisition processing. The processing circuitry 70 serving as the image point acquisition function 73 specifies the imaging positions of the light rays for respective colors based on the image data for each color. The imaging positions at which the light rays are imaged can be expressed as the incident positions of the light rays on the imaging plane 61. The processing circuitry 70 serving as the image point acquisition function 73 performs, for example, image processing such as edge enhancement for the image data, and specifies an imaging position corresponding to the object point O. At this time, image processing such as pixel matching can be performed for, for example, the shape of the detected edge.

Note that if a point light source is used as the object point O, for example, a position whose luminance value is high is specified as an imaging position in the image data. If, for example, a transmissive dot pattern or the like is used as the object point O, the above-described image processing such as edge detection or pixel matching is performed.

In step S23, the processing circuitry 70 executes the object point calculation processing. The processing circuitry 70 serving as the object point calculation function 74 calculates the three-dimensional position of the object point O of the subject based on the imaging positions of the light rays for the respective colors on the imaging plane 61.

The object point calculation processing will be described in more detail.

Assume that (x, y, z) represent coordinates indicating the position of the object point O in the three-dimensional space. Assume that (p, q) represent coordinates indicating the incident position, on the imaging plane 61, of the red light ray R which has been emitted from the object point O and passed through the optical system 30 as a telecentric optical system. In addition, assume that (P, Q) represent coordinates indicating the incident position, on the imaging plane 61, of the blue light ray B which has been emitted from the object point O and passed through the optical system 30 as a non-telecentric optical system. Note that the incident position on the imaging plane 61 is the imaging position of the light ray.

Assume that the radius of the central region of the second color filter 325 is the radius r0. That is, the radius r0 is the radius r1 of the second region A2 of the second color filter 325. In this case, the second region A2 of the second color filter 325 is a region through which the blue light ray B is transmitted. Furthermore, assume that the radius of the central region of the first color filter 323 is the radius r1. That is, the radius r1 is the radius r1 of the second region A2 of the first color filter 323. The second region A2 of the first color filter 323 is a region through which the red light ray R is transmitted.

At this time, by geometric optics, the imaging position of the blue light ray B having passed through the optical system 30 as a non-telecentric optical system is given by:

$$\begin{bmatrix} P \\ Q \end{bmatrix} = \left(\frac{L}{z}\right)\begin{bmatrix} x \\ y \end{bmatrix} \pm \left(\frac{L}{f}\left(1-\frac{f}{z}\right)-1\right)\begin{bmatrix} r_0 \\ r_0 \end{bmatrix}. \quad \text{Equation (1)}$$

The second term on the right-hand side of equation (1) represents a marginal ray passing through the end portion of the second region A2 of the second color filter 325.

On the other hand, by geometric optics, the imaging position of the red light ray R having passed through the optical system 30 as a telecentric optical system is given by:

$$\begin{bmatrix} p \\ q \end{bmatrix} = \left(\frac{L}{f}-1\right)\begin{bmatrix} x \\ y \end{bmatrix} \pm \left(\frac{L}{f}-\frac{1}{f}\left(\frac{L}{f}-1\right)z\right)\begin{bmatrix} r_1 \\ r_1 \end{bmatrix}, \quad \text{Equation (2)}$$

The second term on the right-hand side of equation (2) represents a marginal ray passing through the end portion of the second region A2 of the first color filter 323.

With equations (1) and (2), by using the imaging position of each light ray, the position of the object point O in the three-dimensional space can be given by:

$$\begin{bmatrix} x \\ y \\ z \end{bmatrix} = \begin{bmatrix} \frac{f}{L-f}p \\ \frac{f}{L-f}q \\ \frac{Lf}{L-f}\frac{\sqrt{p^2+q^2}}{\sqrt{P^2+Q^2}} \end{bmatrix}. \quad \text{Equation (3)}$$

The processing circuitry 70 according to this embodiment can calculate the three-dimensional position of the object point based on the imaging data using equation (3). Furthermore, in the image point acquisition processing, the plurality of imaging positions corresponding to the plurality of object points O on the subject are acquired for each color. Therefore, the processing circuitry 70 according to this embodiment has the effect capable of calculating the three-dimensional shape of the subject based on the imaging data.

Actual measurement and evaluation associated with the optical test system 1 according to this embodiment will now be described. FIG. 12 is a view explaining the object point O in actual measurement and evaluation according to this embodiment. In actual measurement and evaluation, a field stop 301 shown in FIG. 12 is arranged on the x-y plane including the object point O in FIG. 8. In the field stop 301, an aperture (opening) 301a is provided. In actual measurement and evaluation, a light ray having passed through the aperture 301a of the field stop 301 is imaged. That is, the object point O in actual measurement and evaluation is an arbitrary position in the aperture 301a. As shown in FIG. 12, the aperture 301a is an annular region centering the optical axis. A region hatched by diagonal solid lines in FIG. 12 is a region that does not transmit visible light. Note that this embodiment explains actual measurement and evaluation using the aperture 301a. However, even if ring illumination is used, the same effect can be obtained. The ring illumination is, for example, a plurality of LEDs (Light Emitting Diodes) arrayed annularly.

FIG. 13A shows an image acquired by the image sensor 60 in actual measurement and evaluation performed by arranging the field stop 301 at a position 160 mm away from the first lens 321 on the −z side. FIG. 13B shows an image acquired by the image sensor 60 in actual measurement and evaluation performed by arranging the field stop 301 at a position 210 mm away from the first lens 321 on the −z side. FIG. 13C shows an image acquired by the image sensor 60 in actual measurement and evaluation performed by arranging the field stop 301 at a position 225 mm away from the first lens 321 on the −z side. Note that in FIGS. 13A, 13B, and 13C, a region hatched by diagonal solid lines is a region where a light ray having passed through the optical system 30 is not imaged. A dot-hatched annular region is a region where a blue light ray is imaged. A crosshatched annular region is a region where a red light ray is imaged.

Figure 14:
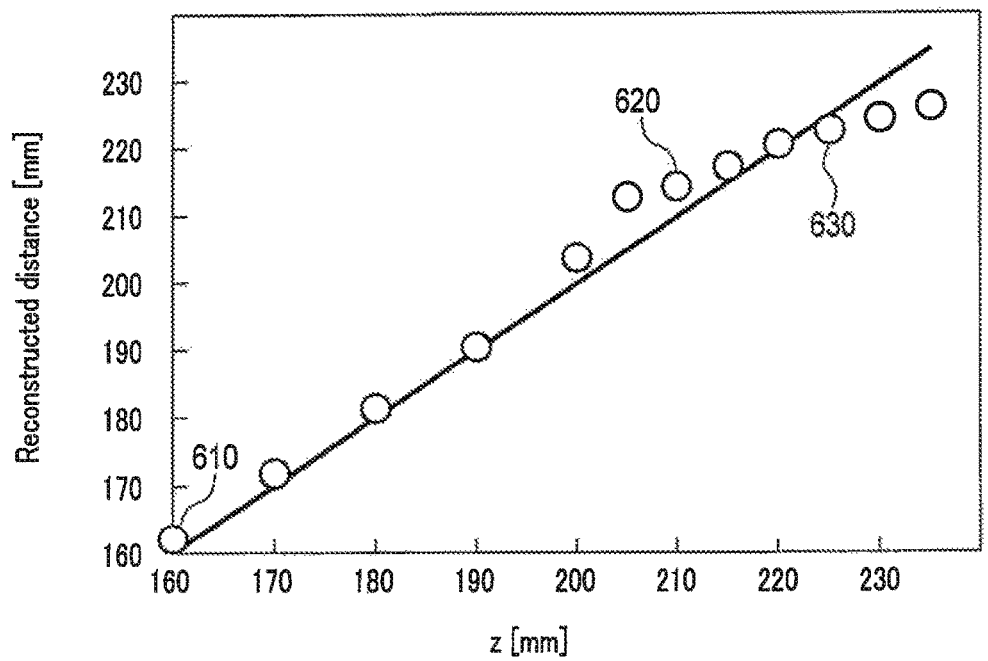
FIG. 14 is a graph showing the result of actual measurement and evaluation according to the second embodiment.

FIG. 14 is a graph showing the result of actual measurement and evaluation according to this embodiment. In the graph shown in FIG. 14, the abscissa represents the actual distance between the first lens 321 and the field stop 301 when actual measurement and evaluation is performed, and the ordinate represents the distance between the first lens 321 and the field stop 301 calculated based on the image data by the calculation processing according to this embodiment. Plots 610, 620, and 630 indicate distances obtained from the images shown in FIGS. 13A, 13B, and 13C, respectively. As shown in FIG. 14, it is apparent that the actual distance of the field stop 301 and the distance calculated based on the image data are almost equal to each other.

As described above, the optical test system 1 according to this embodiment can accurately measure the three-dimensional position of the object point O. Note that the three-dimensional position of the object point O is an example of the information pertaining to the subject. That is, the technique according to this embodiment can accurately measure the three-dimensional surface shape of the subject.

Third Embodiment

An optical test system 1 according to this embodiment will be described in detail below with reference to the accompanying drawings. The difference from the second embodiment will mainly be described. The same reference numerals denote the same parts and a description thereof will be omitted.

In this embodiment, the wavelength of a red light ray is an example of the first wavelength. The wavelength of a blue light ray is an example of the second wavelength.

The arrangement of the optical test system 1 according to this embodiment will be described first.

Figure 15:
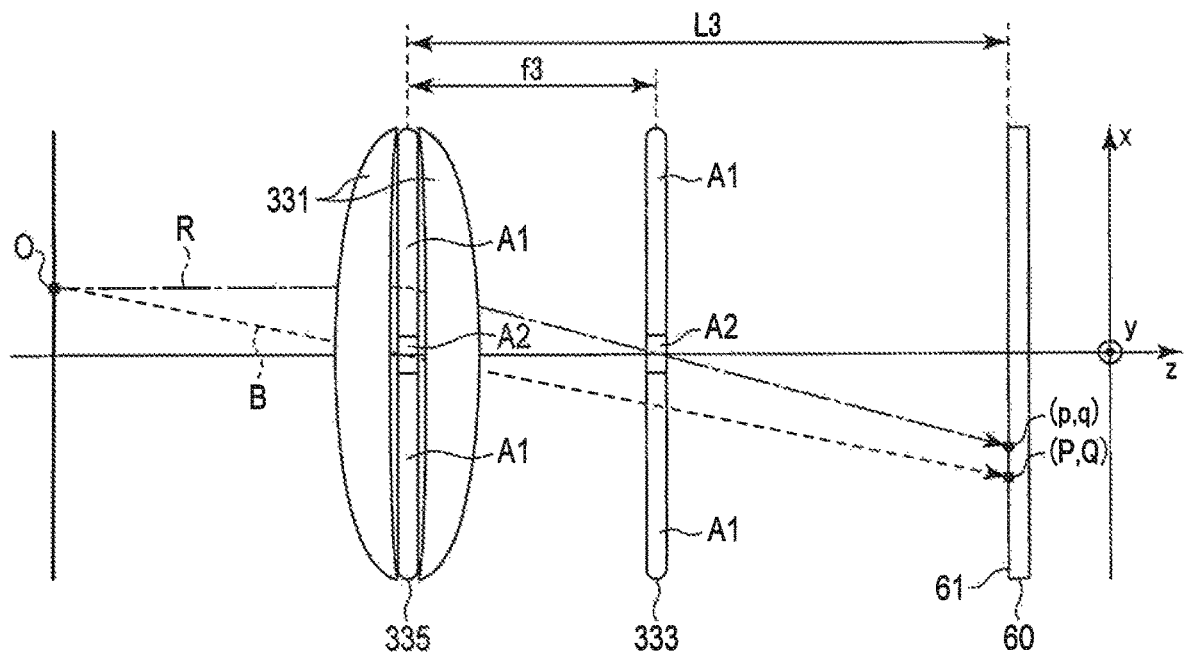
FIG. 15 is an x-z sectional view showing an example of the arrangement of an optical device according to the third embodiment.

FIG. 15 is an x-z sectional view showing an example of the arrangement of an optical device 20 according to this embodiment. Note that FIG. 15 schematically shows an example of the light ray path of the principal ray of light rays emitted from an object point O. As shown in FIG. 15, an optical system 30 according to this embodiment includes first lenses 331, a second color filter 335, and a first color filter 333.

Note that in this embodiment, the z-axis serves as the optical axis of each first lenses 331. The ±z direction is a direction from the first lenses 331 to an imaging plane 61 of an image sensor 60. The x- and y-axes are orthogonal to each other, and also orthogonal to the z-axis. The −x direction is, for example, the gravity direction. For example, in the x-z sectional view of the optical device 20 shown in FIG. 15, the direction is a direction from left to right, the −x direction is a direction from above to below, and the +y direction is a direction from back to front perpendicularly with respect to a paper surface.

The first lenses 331 form an image of the light ray emitted from the object point O on the subject at an image point on the imaging plane 61 of the image sensor 60. The first lenses 331 are provided as an example of a shared lens. The first lenses 331 are given as an example of a pair of lenses. An image-side focal length f of the first lenses 331 is a focal length f3. The first lenses 331 include an object-side lens and an image-side lens. The object-side lens and the image-side lens have the same optical axis. The object-side lens and the image-side lens are symmetrical in the optical axis direction of the first lenses 331. The object-side lens of the first lenses 331 corresponds to the first lens 321 according to the second embodiment. An optical path length L between the imaging plane 61 and the image-side principal point of the first lenses 331 is an optical path length L3.

The second color filter 335 corresponds to the second color filter 325 according to the second embodiment. That is, the red transmission filter of the second color filter 335 is an example of the fourth wavelength selecting filter. The blue transmission filter of the second color filter 335 is an example of the fifth wavelength selecting filter. As shown in FIG. 15, the second color filter 335 is arranged between the object-side lens and the image-side lens of the first lenses 331.

The first color filter 333 corresponds to the first color filter 323 according to the second embodiment. That is, the red transmission filter of the first color filter 333 is an example of the first wavelength selecting filter. The blue transmission filter of the first color filter 333 is an example of the second wavelength selecting filter. As shown in FIG. 15, the first color filter 333 is arranged at the image-side focal point of the first lenses 331. That is, the first color filter 333 is arranged at a position away from the first lenses 331 on the +z side by the focal length f3. The first color filter 333 may be expressed as being arranged at a position away from the second color filter 335 on the +z side by the focal length f3. The opening of the first color filter 333 can be expressed as being located on the image-side focal plane of the first lenses 331.

As described above, the optical device 20 according to this embodiment can be expressed as the optical device 20 obtained by adding the image-side lens of the first lenses 331 to the optical device 20 according to the second embodiment.

The operation of the optical test system 1 according to this embodiment is the same as that of the optical test system 1 according to the second embodiment.

In this arrangement, the center of the second color filter 335 and that of the first lenses 331 can be made to coincide with each other in the z-axis direction. Therefore, in the optical test system 1 according to this embodiment, it is possible to obtain the effect of improving the measurement accuracy of light rays B in addition to the effect obtained in the optical test system 1 according to the second embodiment.

Fourth Embodiment

An optical test system 1 according to this embodiment will be described in detail below with reference to the accompanying drawings. The difference from the first embodiment will mainly be described. The same reference numerals denote the same parts and a description thereof will be omitted.

In this embodiment, the wavelength of a red light ray is an example of the first wavelength. The wavelength of a blue light ray is an example of the second wavelength.

The arrangement of the optical test system 1 according to this embodiment will be described first.

FIG. 16 is an x-z sectional view showing an example of the arrangement of an optical device 20 according to this embodiment. FIG. 16 schematically shows an example of the light ray path of the principal ray of light rays emitted from an object point O. As shown in FIG. 16, an optical system 30 according to this embodiment includes an object-side beam splitter 346a, an object-side mirror 347a, a first lens 341a, a first wavelength selecting filter 344a, an aperture stop 344c, an image-side mirror 347b, an image-side beam splitter 346b, a second lens 341b, and a second wavelength selecting filter 344b.

Note that in this embodiment, the z-axis serves as the optical axis of the second lens 341b. The direction is a direction from the second lens 341b to an imaging plane 61 of an image sensor 60. The x- and y-axes are orthogonal to each other, and also orthogonal to the z-axis. The −x direction is, for example, the gravity direction. For example, in the x-z sectional view of the optical device 20 shown in FIG. 16, the +z direction is a direction from left to right, the −x direction is a direction from above to below, and the +y direction is a direction from back to front perpendicularly with respect to a paper surface.

Note that the optical system 30 according to this embodiment includes a telecentric optical system and a non-telecentric optical system. The telecentric optical system includes the object-side beam splitter 346a, the object-side mirror 347a, the first lens 341a, the first wavelength selecting filter 344a, the aperture stop 344c, the image-side mirror 347b; and the image-side beam splitter 346b. The non-telecentric optical system includes the object-side beam splitter 346a, the second lens 341b, the second wavelength selecting filter 344b, and the image-side beam splitter 346b.

As shown in FIG. 16, in the telecentric optical system, the object-side beam splitter 346a, the object-side mirror 347a, the first lens 341a, the first wavelength selecting filter 344a, the aperture stop 344c, the image-side mirror 347b, and the image-side beam splitter 346b are sequentially arranged from the object side. On the other hand, in the non-telecentric optical system, the object-side beam splitter 346a, the second lens 341b, the second wavelength selecting filter 344b, and the image-side beam splitter 346b are sequentially arranged from the object side.

Each of the first lens 341a and the second lens 341b forms an image of the light ray emitted from the object point O at an image point on the imaging plane 61 of the image sensor 60. An image-side focal length f of the first lens 341a is a focal length f4. The first lens 341a and the second lens 341b are arranged at a position of an optical path length a from the arbitrary object point O on the subject surface. The second lens 341b is arranged at a position of an optical path length b from an arbitrary image point on the imaging plane 61. The sum of the reciprocal of the optical path length a and the reciprocal of the optical path length b is equal to the reciprocal of the focal length f4. The first lens 341*a* and the second lens 341*b* correspond to the first lens 311 according to the first embodiment. An optical path length L between the imaging plane 61 and the image-side principal point of the first lens 341*a* is an optical path length L4.

As shown in FIG. 16, the object-side beam splitter 346*a* and the image-side beam splitter 346*b* are arranged on the optical axis of the second lens 341*b*. As shown in FIG. 16, the object-side beam splitter 346*a* according to this embodiment divides the light ray emitted from the object point O in a direction toward the second lens 341*b* and a direction toward the object-side mirror 347*a*. As shown in FIG. 16, the image-side beam splitter 346*b* according to this embodiment combines an incident light ray from the image-side mirror 347*b* and a light ray having passed through the second wavelength selecting filter 344*b*, and emits the combined light ray toward the imaging plane 61.

As shown in FIG. 16, the object-side mirror 347*a* and the image-side mirror 347*b* are arranged on the optical axis of the first lens 341*a*. The object-side mirror 347*a* reflects an incident light ray from the object-side beam splitter 346*a* to enter the first lens 341*a*. The image-side mirror 347*b* reflects a light ray transmitted through the aperture stop 344*c* to enter the image-side beam splitter 346*b*.

Figure 17:
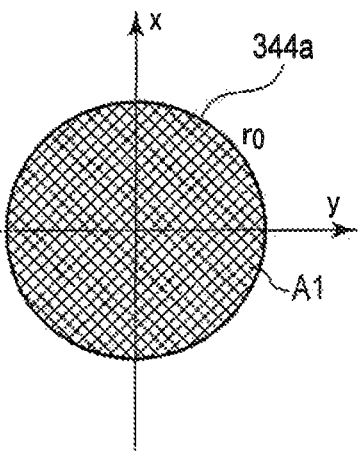
FIG. 17 is a schematic view showing an example of the x-y section of the opening of the first wavelength selecting filter according to the fourth embodiment.

As shown in FIG. 16, the first wavelength selecting filter 344*a* is arranged adjacent to the first lens 341*a*. FIG. 17 is a schematic view showing an example of the x-y section of the opening of the first wavelength selecting filter 344*a* according to this embodiment. As shown in FIG. 17, a wavelength selecting member provided in the opening of the first wavelength selecting filter 344*a* includes one wavelength selecting region, that is, a first region A1. The first region A1 is a region ranging over a radius r0 or less, and a region where a red transmission filter for transmitting a red light ray is provided. The first region A1 is arranged on the optical axis of the first lens 341*a*.

Note that the first wavelength selecting filter 344*a* is arranged at any position in a region, including the first lens 341*a*, between the object-side beam splitter 346*a* and the image-side beam splitter 346*b*.

Figure 18:
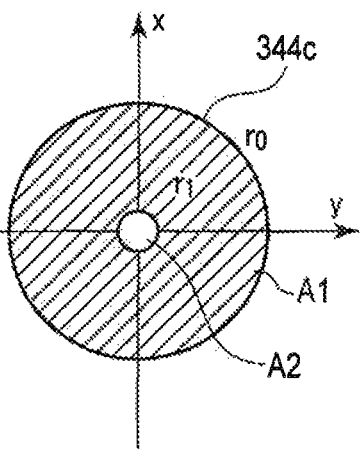
FIG. 18 is a schematic view showing an example of the x-y section of the aperture of an aperture stop according to the fourth embodiment.

As shown in FIG. 16, the aperture stop 344*c* is arranged at the image-side focal point of the first lens 341*a*. That is, the aperture stop 344*c* is arranged at a position away from the first lens 341*a* on the +z side by the focal length f4. The aperture (opening) of the aperture stop 344*c* can be expressed as being located on the image-side focal plane of the first lens 341*a*. FIG. 18 is a schematic view showing an example of the x-y section of the aperture of the aperture stop 344*c* according to this embodiment. As shown in FIG. 18, a wavelength selecting member provided in the aperture of the aperture stop 344*c* includes two concentric wavelength selecting regions of a first region A1 and a second region A2. The first region A1 is a region ranging from a radius r1 to the radius r0. The first region A1 does not transmit a light ray of any wavelength in the visible light range. That is, the color of the wavelength selecting member forming the first region A1 is black. The second region A2 is a region ranging over the radius r1 or less. The second region A2 transmits a light ray of any wavelength in the visible light range. That is, the color of the wavelength selecting member forming the second region A2 is transparent. Note that the wavelength selecting member need not provided in the second region A2.

Figure 19:
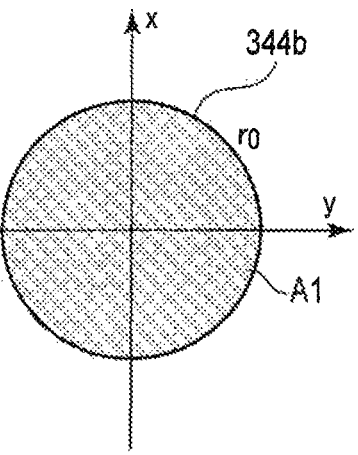
FIG. 19 is a schematic view showing an example of the x-y section of the opening of the second wavelength selecting filter according to the fourth embodiment.

As shown in FIG. 16, the second wavelength selecting filter 344*b* is arranged adjacent to the second lens 341*b*. FIG. 19 is a schematic view showing an example of the x-y section of the opening of the second wavelength selecting filter 344*b* according to this embodiment. As shown in FIG. 19, a wavelength selecting member provided in the opening of the second wavelength selecting filter 344*b* includes one wavelength selecting region, that is, the first region A1. The first region A1 is a region ranging over the radius r0 or less, and a region where a blue transmission filter for transmitting a blue light ray is provided. The first region A1 is arranged on the optical axis of the second lens 341*b*.

Note that the first wavelength selecting filter 344*a*, the aperture stop 344*c*, and the second wavelength selecting filter 344*b* according to this embodiment correspond to the first color filter 313 according to the first embodiment, the first color filter 323 according to the second embodiment, or the first color filter 333 according to the third embodiment.

As described above, in the optical system 30 according to this embodiment, the optical axis of the telecentric optical system 40 as the optical axis of the first lens 341*a* and the optical axis of the not-telecentric optical system 50 as the optical axis of the second lens 341*b* are not coaxial with each other.

The operation of the optical test system 1 according to this embodiment will be described next.

Light rays including light rays B and R are emitted from the arbitrary object point O on the subject surface. These light rays are light rays of environment light or the like reflected or scattered at the object point O. Some of the light rays emitted from the arbitrary object point O enter the first lens 341*a* via the object-side beam splitter 346*a* and the object-side mirror 347*a*, and the remaining light rays enter the second lens 341*b* via the object-side beam splitter 346*a*.

Among the light rays having passed through the first lens 341*a*, the red light rays R can pass through the first wavelength selecting filter 344*a*. Among the light rays having passed through the first wavelength selecting filter 344*a*, the red light ray R that is parallel to the optical axis of the first lens 341*a* when entering the first lens 341*a* can pass through the second region A2 of the aperture stop 344*c* arranged at the image-side focal point of the first lens 341*a*. On the other hand, the light ray that is not parallel to the optical axis of the first lens 341*a* when entering the first lens 341*a* cannot pass through the aperture stop 344*c*. The red light ray R having passed through the aperture stop 344*c* enters the image-side beam splitter 346*b* via the image-side mirror 347*b*.

Among the light rays having passed through the second lens 341*b*, the blue light ray B can' pass through the second wavelength selecting filter 344*b*. The blue light rays B having passed through the second wavelength selecting filter 344*b* enters the image-side beam splitter 346*b*.

In the image-side beam splitter 346*b*, the optical axis of the red light ray R having passed through the telocentric optical system and that of the blue light ray B having passed through the non-telecentric optical system coincide with each other.

The operations of the image sensor 60 and the processing circuitry 70 according to this embodiment are the same as those of the image sensor 60 and the processing circuitry 70 according to the second or third embodiment.

As described above, in the optical system 30 according to this embodiment, among the light rays emitted from the object point O, a light ray having passed through the telecentric optical system is imaged as the red light ray R. On the other hand, among the light rays emitted from the object point O, a light ray having passed through the non-telecentric optical system is imaged as the blue light ray B. That is, the optical system 30 according to this embodiment has telecentricity for the red light ray. In the optical test apparatus 10 according to this embodiment, the light rays emitted from the same object point O are imaged as light rays of different colors in accordance with the optical systems through which the light rays have passed.

In the optical test system 1 according to this embodiment, it is possible to obtain the following effect in addition to the effect obtained in the optical test system 1 according to the second embodiment. In the optical test system 1 according to this embodiment, the telecentric optical system 40 and the non-telecentric optical system 50 are not coaxial with each other, and can thus be adjusted independently. Folding of the light ray path can improve the degree of freedom of the design of the optical device 20. Note that the object-side mirror 347a and the image-side mirror 347b may be included in the non-telecentric optical system 50.

Note that the technique according to the third embodiment is applicable to the optical test system 1 according to this embodiment. At this time, in addition to the above-described effect, the effect obtained in the third embodiment is further obtained.

Figure 20:
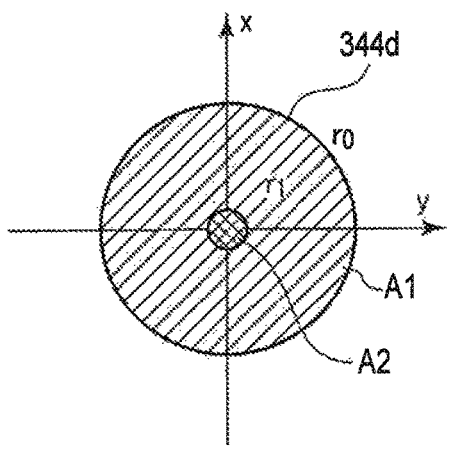
FIG. 20 is a schematic view showing an example of the x-y section of the opening of the first wavelength selecting filter according to a modification of the fourth embodiment.

Note that the first wavelength selecting filter 344a and the aperture stop 344c may be formed integrally. FIG. 20 is a schematic view showing an example of the x-y section of the opening of a first wavelength selecting filter 344d according to a modification of this embodiment. The first wavelength selecting filter 344d according to the modification is formed by the first wavelength selecting filter 344a and the aperture stop 344c which are formed integrally. The first wavelength selecting filter 344d according to the modificatio arranged at the image-side focal point of the first lens 341a, similar to the aperture stop 344c. As shown in FIG. 20, a wavelength selecting member provided in the opening of the first wavelength selecting filter 344d according to the modification includes two concentric wavelength selecting regions of a first region A1 and a second region A2. The first region A1 is a region ranging from a radius r1 to a radius r0. The first region A1 does not transmit a light ray of any wavelength in the visible light range. That is, the color of the wavelength selecting member forming the first region A1 is black. The second region A2 is a region ranging over the radius r1 or less. The second region A2 is a region where a red transmission filter for transmitting a red light ray is provided. Note that the second region A2 is arranged on the optical axis of the second lens 341b. That is, it can be expressed that the first wavelength selecting filter 344d according to the modification is arranged on the aperture plane of the aperture stop 344c, and the first wavelength selecting filter 344a and the aperture stop 344c are integrally formed. In this arrangement, in addition to the same effect as that described above, it is possible to obtain the effects of reducing the number of parts and the use amount of the wavelength selecting member, downsizing the optical system 30, and reducing the cost.

Note that the first lens 341a and the second lens 341b may be formed integrally. In this case, in the optical system 30 according to this embodiment, the telecentric optical system 40 and the non-telecentric optical system 50 can be expressed as sharing at least one lens. That is, the first lens 341a and the second lens 341b that are integrally formed are given as an example of the shared lens. The first lens 341a and the second lens 341b that are integrally formed are arranged between the object point O and the object-side beam splitter 346a. The aperture stop 344c is arranged, via the object-side beam splitter 346a and the object-side mirror 347a, at the image-side focal point of the first lens 341a and the second lens 341b that are integrally formed. In this arrangement, in addition to the same effect as that described above, it is possible to obtain the effects of reducing the number of parts, downsizing the optical system 30, and reducing the cost.

Note that the first wavelength selecting filter 344a and the aperture stop 344c may be formed integrally, and the first lens 341a and the second lens 341b may also be formed integrally. In this arrangement as well, it is possible to obtain the same effect as that described above.

Fifth Embodiment

Each of the first, second, third, and fourth embodiments has explained the optical device 20 having telecentricity on the object side. The present invention, however, is not limited to this. The optical device 20 according to each embodiment need only have telecentricity on at least the object side, and may also have telecentricity on the image side. In an image-side telecentric optical system, an exit pupil is located at an infinite position, and an optical axis and a principal ray are parallel to each other in an image space. That is, the optical system 30 according to each embodiment may be double telecentric optical system for a light ray of one of wavelengths.

A case in which the optical system 30 according to the second embodiment has also telecentricity on the image side will be exemplified. The difference from the second embodiment will mainly be described. The same reference numerals denote the same parts and a description thereof will be omitted.

In this embodiment, the wavelength of a red light ray is an example of the first wavelength. The wavelength of a blue light ray is an example of the second wavelength.

The arrangement of an optical test system 1 according to this embodiment will be described first.

Figure 21:
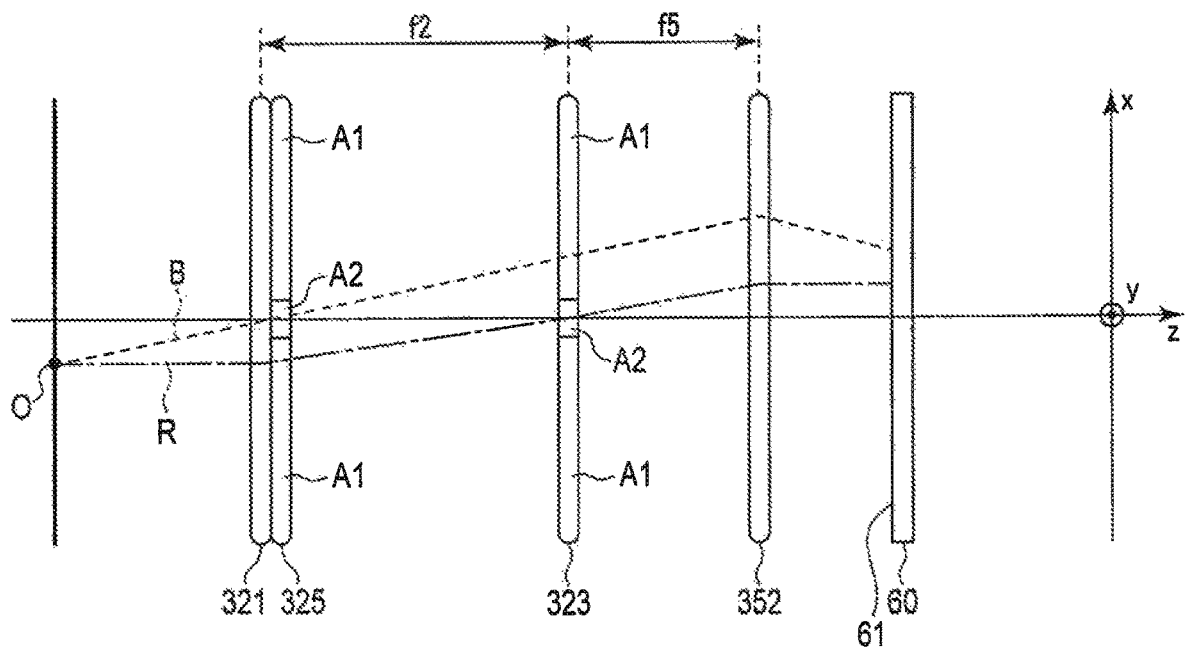
FIG. 21 is an x-z sectional view showing an example of the arrangement of an optical device according to the fifth embodiment.

FIG. 21 is an x-z sectional view showing an example of the arrangement of an optical device 20 according to this embodiment. Note that FIG. 21 schematically shows an example of the light ray path of the principal ray of light rays emitted from an object point O. As shown in FIG. 21, an optical system 30 according to this embodiment includes the optical system 30 according to the second embodiment and a third lens 352.

The third lens 352 forms an image of a light ray having passed through a first color filter 323 on an imaging plane 61. The third lens 352 is identical to, for example, the first lens 321 according to the second embodiment. The third lens 352 is arranged between the first color filter 323 and the imaging plane 61. The first color filter 323 is arranged at the object-side focal point (object-side focus) of the third lens 352. The object-side focal length of the third lens 352 is a focal length f5. That is, the third lens 352 is arranged at a position away from the first color filter 323 on the +z side by the focal length f5. The optical axis of the third lens 352 is coaxial with the optical axis of the first lens 321.

The operation of the optical test system 1 according to this embodiment will be described next.

A red light ray R having passed through a second region A2 of the first color filter 323 is emitted from the third lens 352 as a light ray that is parallel to the optical axis of the third lens 352. On the other hand, a blue light ray B having passed through a first region A1 of the first color filter 323 is emitted from the third lens 352 as a light ray that is not parallel to the optical axis of the third lens 352.

As described above, the optical system 30 according to this embodiment is a double telecentric optical system having telecentricity on the object side and the image side for the red light ray R. Furthermore, the optical system 30 according to this embodiment is a normal optical system having no telecentricity on either the object side or the image side for the blue light ray B. In this arrangement, in addition to the above-described effects, it is possible to obtain the effect of improving the degree of freedom associated with the design of the optical device 20, such as the arrangement of the image sensor 60.

Note that each of the radii r2, r1, and r0 according to each of the above-described embodiments is a value that can be appropriately set in accordance with the size and arrangement of each optical element of the optical system 30 according to each embodiment.

Note that in the optical test system 1 according to each of the second, third, fourth, and fifth embodiments, three or more wavelength selecting regions may be provided, similar to the first color filter 313 according to the first embodiment. In this case, for example, an optical system having telecentricity on the object side for the red light ray can calculate the three-dimensional position of the object point O based on the imaging positions of the red light rays and the imaging positions of the blue or green light rays. This arrangement can improve the accuracy of the calculation processing.

Note that the technique according to each of the above-described embodiments can implement the following optical test method. The optical test method according to each of the above-described embodiments includes imaging an object to acquire image data based on light rays having passed through the optical system 30 among the light rays emitted from the object point O. The optical system 30 includes the telecentric optical system 40 and the non-telecentric optical system 50. The telecentric optical system 40 has telecentricity on the object side for the light ray of the first wavelength. The non-telecentric optical system has no telecentricity for the light ray of the second wavelength. Note that the first wavelength is different from the second wavelength. Assume that the light rays emitted from the object point O include the first and second wavelengths. At this time, the optical test method according to each of the above-described embodiments acquires image data by simultaneously imaging the light rays of the first wavelength having passed through the telecentric optical system 40 and the light rays of the second wavelength having passed through the non-telecentric optical system 50. The optical test method according to each of the above-described embodiments further includes generating image data for respective colors by performing color separation for the acquired image data. The optical test method according to each of the above-described embodiments also includes calculating information pertaining to the subject including the object point O based on the image data for respective colors.

The techniques according to the respective embodiments and the modifications can measure information concerning the subject (test object) with high accuracy.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions,

What is claimed is:

1. An optical test apparatus comprising:
    a first optical system configured to pass a light ray of a first wavelength and having telecentricity on an object side for the light ray of the first wavelength;
    a second optical system configured to pass a light ray of a second wavelength different from the first wavelength; and
    an image sensor configured to image an object based on the light ray of the first wavelength having passed through the first optical system and the light ray of the second wavelength having passed through the second optical system, wherein
    the first optical system further includes a first wavelength selecting filter configured to pass the light ray of the first wavelength, and
    the second optical system further includes a second wavelength selecting filter configured to pass the light ray of the second wavelength.

2. The apparatus of claim 1, wherein the first optical system and the second optical system include at least one shared lens arranged on an optical axis of the first optical system and shared by the first optical system and the second optical system.

3. The apparatus of claim 2, wherein the optical axis of the first optical system and an optical axis of the second optical system are coaxial with each other.

4. The apparatus of claim 1, wherein the first wavelength selecting filter and the second wavelength selecting filter are formed integrally as a first color filter.

5. The apparatus of claim 4, wherein the first color filter is arranged on a focal plane of the shared lens.

6. The apparatus of claim 5, wherein
    in the first color filter, the first wavelength selecting filter and the second wavelength selecting filter are arranged to be rotationally symmetrical with respect to an optical axis of the shared lens, and
    the first wavelength selecting filter is arranged on light ray paths of light rays among which a principal ray passes through a focal point of the shared lens.

7. The apparatus of claim 6, wherein
    the second optical system further includes a third wavelength selecting filter configured to pass a light ray of a third wavelength different from the first wavelength and the second wavelength,
    the third wavelength selecting filter is arranged in the first color filter to be rotationally symmetrical with respect to the optical axis of the shared lens together with the first wavelength selecting filter and the second wavelength selecting filter, and
    the image sensor is configured to coaxially image the light ray of the third wavelength having passed through the second optical system.

8. The apparatus of claim 6, further comprising
    a second color filter arranged adjacent to the shared lens and including a fourth wavelength selecting filter configured to pass the light ray of the first wavelength and a fifth wavelength selecting filter configured to pass the light ray of the second wavelength, both of which are arranged concentrically with respect to the optical axis of the shared lens,
    wherein the fifth wavelength selecting filter is arranged on the optical axis of the shared lens.

9. The apparatus of claim 8, wherein
the shared lens comprises a pair of lenses symmetrical in an optical axis direction, and
the second color filter is arranged between the pair of lenses.

10. The apparatus of claim 1, wherein
the first optical system further includes a first lens, and an aperture stop arranged on an image side focal plane of the first lens and provided with an aperture on light ray paths of light rays among which a principal ray passes through a focal point of the first lens,
the second optical system further includes a second lens, and
the optical axis of the first optical system as an optical axis of the first lens and the optical axis of the second optical system as an optical axis of the second lens are not coaxial with each other.

11. The apparatus of claim 10 wherein the first wavelength selecting filter is arranged on an aperture plane of the aperture stop, and the first wavelength selecting filter and the aperture stop are formed integrally.

12. The apparatus of claim 1, wherein the first optical system has telecentricity on an image side.

13. The apparatus of claim 1, further comprising processing circuitry configured to generate image data for respective colors by performing color separation for image data output from the image sensor, and calculate information pertaining to the object based on the image data for respective colors.

14. The apparatus of claim 13, wherein the processing circuitry specifies color of the light ray imaged based on the image data for respective colors, and calculates a scattering angle at a point on the object as the information pertaining to the object based on the color of the imaged light ray.

15. The apparatus of claim 13, wherein the processing circuitry specifies an imaging position of a point on the object in each of the image data for respective colors, and calculates a three dimensional position of the point on the object as the information pertaining to the object based on the plurality of imaging positions.

16. The apparatus of claim 15, wherein
when an imaging plane of the image sensor is parallel to an x axis and a y axis, and an optical axis of the first optical system is parallel to a z axis,
p and q respectively represent an x coordinate and a y coordinate to indicate an imaging position of the light ray of the first wavelength having passed through the first optical system,
P and Q respectively represent an x coordinate and a y coordinate to indicate an imaging position of the light ray of the second wavelength having passed through the second optical system,
f represents an image side focal length of a lens of the first optical system, and
L represents an optical path length between the imaging plane and the lens of the first optical system,
the processing circuitry calculates an x coordinate, a y coordinate, and a z coordinate to indicate the three dimensional position of the point on the object based on a relationship given by:

$$\begin{bmatrix} x \\ y \\ z \end{bmatrix} = \begin{bmatrix} \frac{f}{L-f} p \\ \frac{f}{L-f} q \\ \frac{Lf}{L-f} \frac{\sqrt{p^2+q^2}}{\sqrt{P^2+Q^2}} \end{bmatrix}.$$

17. An optical test method comprising:
imaging an object to acquire image data based on a light ray of a first wavelength having passed through a first optical system and a light ray of a second wavelength having passed through a second optical system, the first optical system including a first wavelength selecting filter configured to pass the light ray of the first wavelength, the first optical system having telecentricity on an object side for the light ray of the first wavelength, the second optical system including a second wavelength selecting filter configured to pass the light ray of the second wavelength being different from the first wavelength;
performing color separation for the image data to generate image data for respective colors by; and
calculating information pertaining to the object based on the image data for respective colors.

* * * * *